United States Patent [19]

Summers, Jr. et al.

[11] Patent Number: 5,578,547
[45] Date of Patent: Nov. 26, 1996

[54] BEAD FOR REMOVING DISSOLVED METAL CONTAMINANTS

[75] Inventors: Bobby L. Summers, Jr., Hudson; Lester B. Gress, Brecksville, both of Ohio

[73] Assignee: Aero-Terra-Aqua Technologies Corp., Cleveland, Ohio

[21] Appl. No.: 249,733

[22] Filed: May 26, 1994

[51] Int. Cl.⁶ .................................... B01J 20/10
[52] U.S. Cl. ........................... 502/407; 502/401
[58] Field of Search ................... 502/401, 407

[56] References Cited

U.S. PATENT DOCUMENTS

| | | | |
|---|---|---|---|
| 3,914,901 | 10/1975 | Muldner | 47/56 |
| 3,925,192 | 12/1975 | Randall et al. . | |
| 3,948,791 | 4/1976 | Tominaga et al. . | |
| 4,013,585 | 3/1977 | Terajima et al. . | |
| 4,033,729 | 7/1977 | Carej et al. | 44/282 |
| 4,067,821 | 1/1978 | Votapek et al. . | |
| 4,239,865 | 12/1980 | Tarao et al. . | |
| 4,293,333 | 10/1981 | Drobot . | |
| 4,293,334 | 10/1981 | Drobot et al. . | |
| 4,352,883 | 10/1982 | Lim . | |
| 4,357,780 | 11/1982 | Ball | 47/56 |
| 4,414,776 | 11/1983 | Ball | 47/9 |
| 4,427,775 | 1/1984 | Chen et al. . | |
| 4,563,425 | 1/1986 | Yoshioka et al. . | |
| 4,626,416 | 12/1986 | DeVoe et al. . | |
| 4,690,894 | 9/1987 | Brierley et al. . | |
| 4,876,287 | 10/1989 | Babcock et al. . | |
| 4,908,137 | 3/1990 | Chen et al. . | |
| 4,909,944 | 3/1990 | Jackson et al. . | |
| 4,992,180 | 2/1991 | Onodera et al. . | |
| 5,096,946 | 3/1992 | Rainer . | |
| 5,108,614 | 4/1992 | Ross et al. . | |
| 5,206,206 | 4/1993 | Buelna et al. . | |
| 5,279,745 | 1/1994 | Jeffers et al. . | |

OTHER PUBLICATIONS

Jeffers, T. H., et al., "Biosorption of Metal Contaminants Using Immobilized Biomass—A Laboratory Study", Report of Investigations 9340, U.S. Dept. of Interior, Bureau of Mines (1992).
Jeffers, T. H., et al., "Wastewater remediation using bio–fix bead technology", *Environmental Issues and Waste Management in Energy and Minerals Production*, (1992), pp. 1379–1387.
Bloom, P. R. and McBride, M. B., "Metal Ion Binding and Exchange with Hydrogen Ions in Acid–Washed Peat", *Soil Science Soc. Am. J.*, vol. 43 (1979), pp. 687–692.
Smith, E. F., et al., "Sulfuric Acid Treatment of Peat for Cation Exchange", *Journal WPCF*, Apr. 1977, pp. 633–638.
BIO–FIX Water Treatment Systems brochure from Harrison Western Environmental Services, (1991), pp. 1–4.
Mars Mineral MMC Pin Mixer brochure for MMC Mars Mineral, Mars, Pennsylvania (1985), pp. 1–2.

*Primary Examiner*—Glenn A. Caldarola
*Assistant Examiner*—In Suk Bullock
*Attorney, Agent, or Firm*—Pearne, Gordon, McCoy & Granger

[57] ABSTRACT

A bead is provided which consists essentially of peat moss or other nonliving biomass immobilized by sodium silicate or polysulfone binder. The bead is effective to remove metal contaminants from dilute aqueous solutions. A method of making metal-ion-sorbing beads is provided, comprising combining peat moss or other nonliving biomass and liquid binder (preferably in a pin mixer where it is whipped), forming wet beads, and drying the beads. The liquid binder is preferably sodium silicate dissolved in water or polysulfone dissolved in methylene chloride.

24 Claims, 2 Drawing Sheets

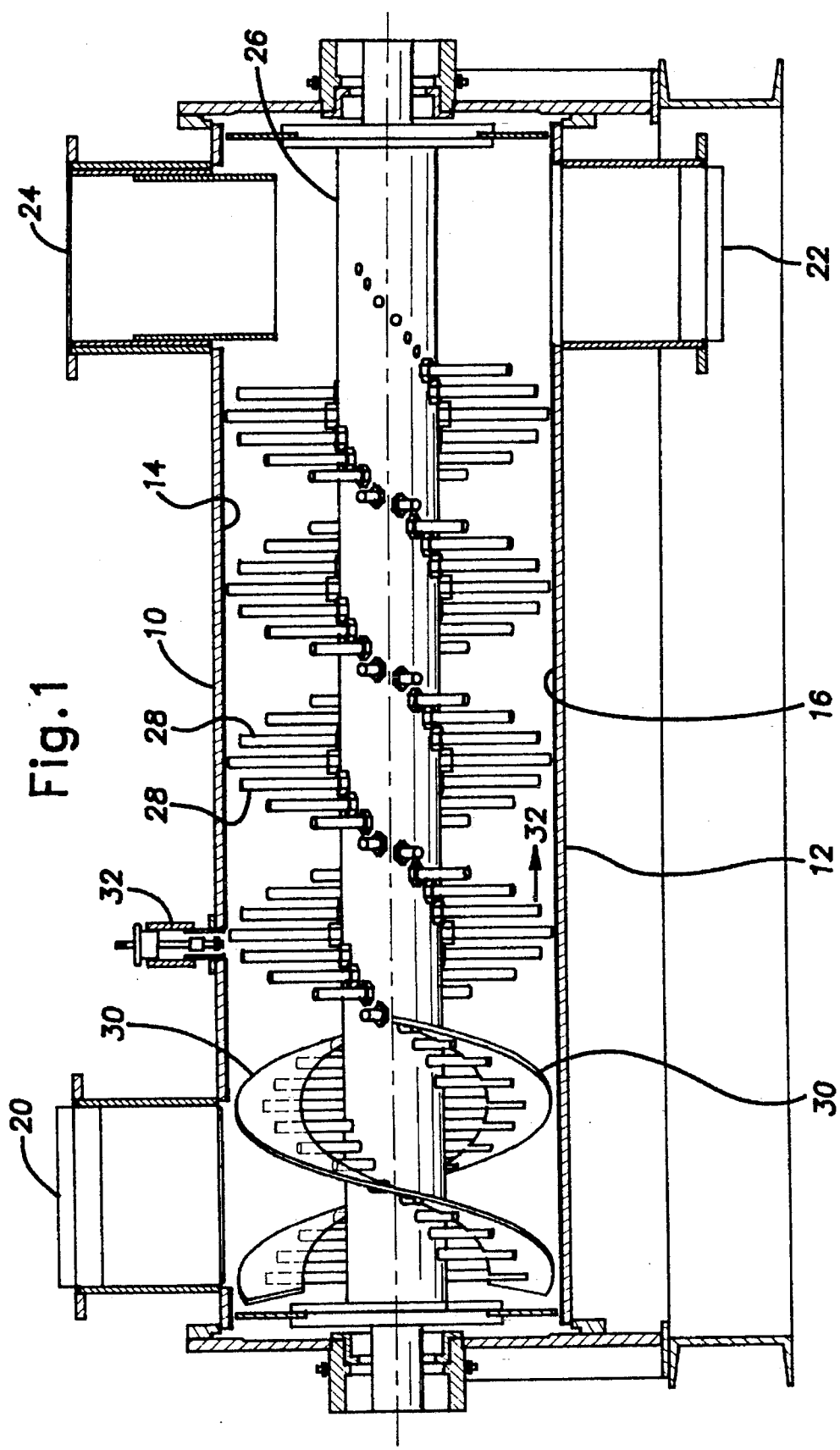

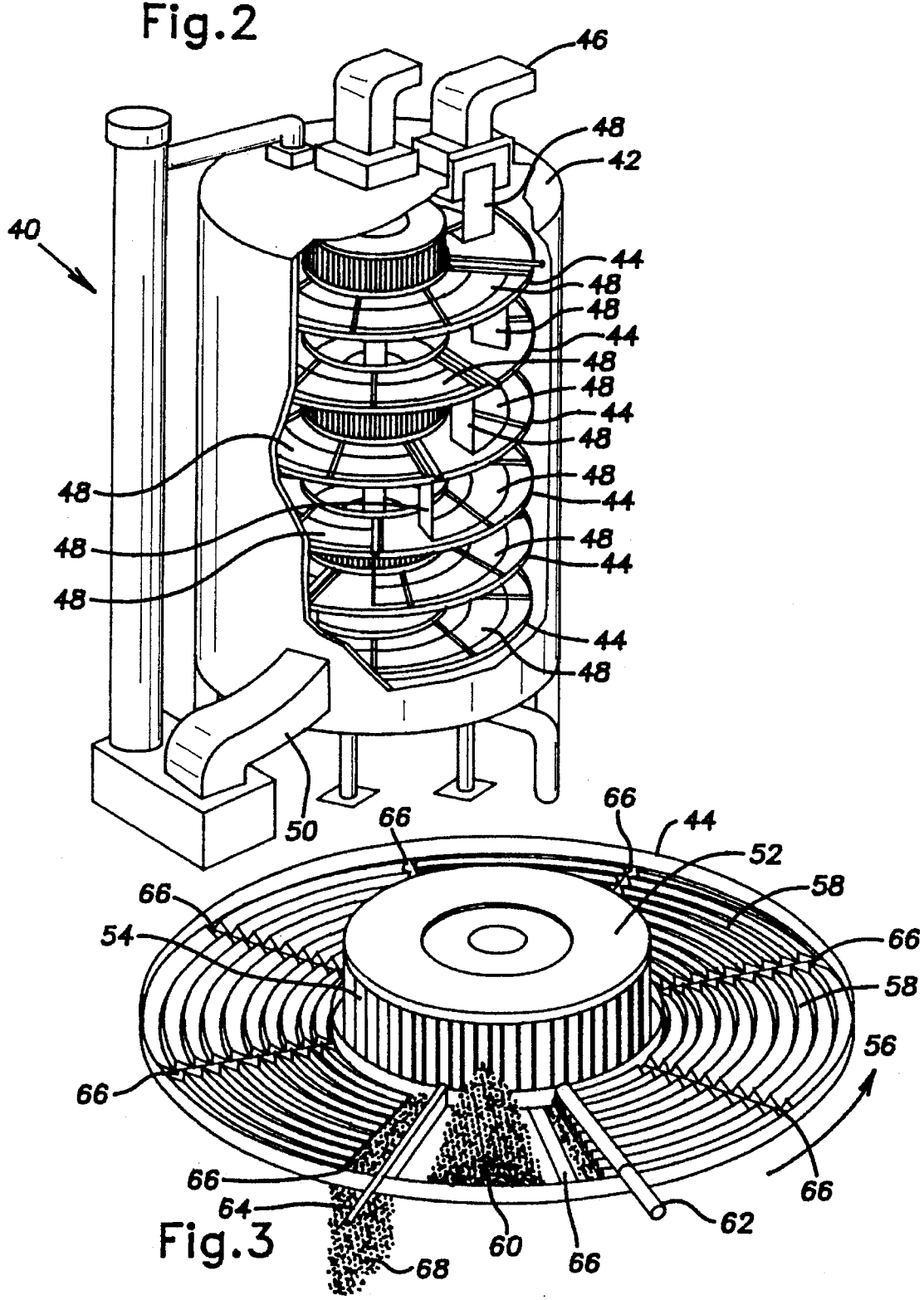

BEAD FOR REMOVING DISSOLVED METAL CONTAMINANTS

BACKGROUND OF THE INVENTION

The present invention relates generally to beads, methods of making beads, and methods of using beads to remove metal contaminants dissolved in aqueous solutions. More particularly, the beads preferably include peat moss and a binder and the peat moss is capable of sorbing dissolved metal ions.

DESCRIPTION OF RELATED ART

The removal of metal contaminants from aqueous wastes such as acid mine drainage water and industrial waste water such as metal finishing waste water and municipal waste water, is an important environmental and economic issue. Some of the metal ions are toxic and some are valuable. In the chemical area of toxic metal recovery from dilute aqueous streams, the techniques of recovery have most commonly been by chemical precipitation, ion exchange, reverse osmosis, electrodialysis, solvent extraction (liquid ion exchange), and chemical reduction. (See U.S. Pat. No. 5,279,745). However, these procedures are characterized by the disadvantages of incomplete metal removal, high reagent and energy requirements, and generation of toxic sludge or other waste products that must be disposed of, and these disadvantages are particularly conspicuous at the low metal concentrations often encountered in waste waters, where federally-mandated cleanup standards dictate that effluents discharged to public waters generally contain less than 1 mg/L of metals such as arsenic, cadmium, lead, mercury and manganese.

Attempts to use biomass of living organisms for metal recovery have been expensive and troublesome, as noted in U.S. Pat. Nos. 5,279,745 and 4,690,894. The use of nonliving biomass such as fungus, molds, yeast, algae and peat as sorbents for metal ions has been attempted (see U.S. Pat. Nos. 4,293,334 and 4,690,894) with varying degrees of success, but limited uptake capacity and recovery of the metal-laden biomass have been problems. Immobilizing nonliving biomass in a granular or polymeric matrix has been suggested to improve biomass performance and facilitate separation of biomass from solution, see U.S. Pat. No. 5,279,745 and Jeffers, T. H. et al. *Biosorption of Metal Contaminants Using Immobilized Biomass—A Laboratory Study*, Report of Investigations 9340, U.S. Dept. of Interior, Bureau of Mines (1992) (the "Jeffers Report"). The Jeffers Report describes immobilization of peat moss in a polysulfone matrix, however, the manufacturing process utilizes dimethylformamide (DMF) as the solvent for the polysulfone, and the process produces beads which have less than optimal performance and which tend to be flat-sided or otherwise non-spheroidal, due to being sprayed into water during the formation step. DMF is a hazardous material the use of which should be avoided. Solvents for polysulfone are generally hazardous. Thus there exists a need for a more effective metal ion sorbent immobilized in a matrix in a mechanical shape such as a bead and for an effective, less-hazardous method of making such beads using binders or matrix materials which do not involve hazardous materials. There is a further need for a process which makes beads which are more uniformly spheroidal than the prior art. Non-spheroidal beads tend to pack asymmetrically, tending to cause water flowing therethrough to flow in certain channels, rather than uniformly over all the beads.

Among the objects of the present invention are to answer these needs.

SUMMARY OF THE INVENTION

A bead is provided which comprises peat moss and sodium silicate, the sodium silicate acting as a binder to immobilize the peat moss. The bead is capable of sorbing a metal or metalloid dissolved in a dilute aqueous solution at a concentration of less than 10 ppm, the metal or metalloid being, for example, silver, iron, chromium, cobalt, uranium, mercury, nickel, arsenic, aluminum, cadmium, lead, manganese, copper, or zinc. A method of making spheroidal beads effective to sorb metal ions, particularly heavy metal and transition metal ions, from a dilute aqueous solution is also provided. The method comprises providing nonliving biomass, such as peat moss, and liquid binder to a chamber of an apparatus for mechanical spheronization, the chamber being equipped with means to impart high shear forces to the contents thereof. High shear forces are imparted to the biomass and liquid binder to mix them together. The mixture is formed into wet beads. The wet beads are then dried to form spheroidal beads effective to sorb metal ions from a dilute aqueous solution. The apparatus for mechanical spheronization is preferably a pin mixer, and the liquid binder is preferably sodium silicate dissolved in water or polysulfone dissolved in methylene chloride.

BRIEF DESCRIPTION OF THE FIGURES

FIG. 1 is an elevational view with the exterior in section of a pin mixer for use in the present invention.

FIG. 2 is a perspective view with part of the casing cut away of a dryer for use in the present invention.

FIG. 3 is a perspective view showing in more detail one of the trays of the dryer of FIG. 2.

DETAILED DESCRIPTION OF THE PREFERRED EMBODIMENTS OF THE INVENTION

The terms sorb, sorbing, and sorption are used in the broad sense to include all forms of metal uptake and attachment, whether by adsorption, absorption, ionic bonding, among other forms of metal uptake and attachment. Parts per million (ppm) and parts per billion (ppb) are parts by weight.

The nonliving biomass to be used in the present invention is preferably sphagnum peat moss, less preferably reed-sedge peat moss and cyprus peat moss. Other less-preferable peat mosses include heath, saw-grass, woody sedge, and sedimentary. It is believed that other less-preferable nonliving biomass materials may be used, including a marine algae (*Ulva* sp.), a blue-green algae, other types of peat, a yeast (*Saccharomyces cerevisiae*), common duckweed (*Lemna* Sp.), and alginate (a carbohydrate polymer) as described in the Jeffers Report (cited above) and U.S. Pat. No. 5,279,745, the entire contents of both of which are incorporated herein by reference.

The sphagnum peat moss preferably has a Von Post index of between about 7 and about 8, less preferably between about 5 and 9. Such sphagnum peat moss is available from Fafard Peat Moss Co., Ltd., Ste-Julie, Quebec, Canada. The peat moss preferably has a moisture content of about 20–50 weight percent prior to mixing with binder.

The peat moss is first sized with a screen having ⅛ inch mesh size to eliminate twigs and larger pieces, these larger pieces being shredded and added back to the unscreened material. The peat moss which passes the screen is dried to the appropriate moisture content, typically 20–50 weight percent, and then mixed with a binder and processed in a machine which yields beads or granules of peat moss mixed with binder.

The preferred binder is a solution of sodium silicate in water. A preferred starting material is product STIXSO RR from The PQ Corporation, Valley Forge, Pa. 19482, which is by weight 9.2% $Na_2O$, 30% $SiO_2$, and 60.8% water. Product STIXSO RR is diluted at 70°–85° F. with water (preferably about 264 g STIXSO RR to 1000 g water, although it may be made more or less diluted) to provide the preferred binder. Typically, the "wetter" the peat moss (the more free moisture), the more concentrated the binder that is used. Another preferred sodium silicate starting material is Sodium Silicate N from The PQ corporation, which is 8.9% $Na_2O$, 28.7% $SiO_2$, and 62.4% water.

The screened peat moss and binder are preferably mixed and processed in an apparatus for mechanical spheronization to yield the mechanical shapes of granules or beads disclosed herein. An apparatus for mechanical spheronization produces spheroidal beads or granules. As used in the specification and claims, an apparatus for mechanical spheronization includes a pin mixer, and an Eirich mixer in combination with a disk pelletizer or spheronizer. The screened peat moss is preferably fed via a regulated screw feeder such as an Accuson screw feeder to a pin mixer. The preferred pin mixer is available from MMC Mars Mineral, P.O. Box 719, Mars, Pa. 16046, such as their Model 12D45L or Model 8D36L. Pin mixers are known devices, the details of which are known and are incorporated by reference. With reference to FIG. 1, the pin mixer has a cylindrical, stationary shell horizontally oriented with a length-to-diameter ratio of between 2 and 5. Upper hemispherical shell 10 and lower hemispherical shell 12 form the cylindrical shell. Upper hemispherical shell 10 may be hinged so the mixer may be opened. The interior surfaces of the shells 10 and 12 are lined with sheet rubber 14 and 16. Inside the shell along its central axis is a shaft 26 with radially-extending rows of metal pins or rods 28. The pins 28, which are means to impart high shear forces, are arranged in a staggered, overlapping double helical pattern and extend into the chamber when the mixing takes place, the mixer shell enclosing the chamber. There is a close tolerance between the tips of the pins and the inside of the mixer shell, for example, 3/16 inch. Shaft rotational speed, and therefore tip speed, is high (several hundred RPM, a typical speed being 900 to 1700 RPM. Optionally, a vent 24 may be provided.) The pin mixer imparts high shear forces (particularly by means of its pins) and rotational forces as well as plug flow characteristics to the material being mixed.

The screened peat moss is entered at inlet 20, moved forward by vanes 30, and the liquid binder is sprayed onto the peat moss from nozzle 32. Additional nozzles can optionally be placed at other radial positions. The injection pressure of sodium silicate binder is preferably about 32 PSI, but will vary depending on viscosity. Preferably about 137 lbs. of the 264:1000 binder described above is added per 100 lbs. of peat moss, depending on moisture content of the peat moss.

Preferably the material inside the pin mixer is 140°–170° F.; generally it takes about 20 minutes of operation to get to this temperature (frictional forces leading to temperature rise). Alternatively steam may be injected to raise the temperature or other means may be used.

The peat moss/binder mixture or media is whipped and mixed and rapidly stirred and high shear forces are imparted with rigid members in an air atmosphere (and not underwater) by the pins 28 as it moves as a plug flow or with plug flow through the shell in the direction indicated by arrow 32 to the bottom outlet 22, where it exits in the form of wet spheroidal beads or granules (typically about 1.18 to 2.36 mm in diameter) having a temperature typically of about 160° F., a moisture content of preferably about 60–70%, more preferably 64–68%, more preferably 66%, by weight, and a bulk density of typically about 32 lbs/ft$^3$. The typical production rate from a pin mixer with an 8 inch diameter tube is about 120 lbs/hr.

It is important to control three variables: dry feed rate (rate at which peat moss is fed in), rate at which binder is added, and the temperature of the material inside the mixer (this temperature being largely influenced by the RPM rate, due to friction generating heat). These rates will vary depending on a number of factors, principally the size of the pin mixer. Preferably, a pressure gauge and temperature gauge are installed on the cylindrical shell to monitor operating conditions and parameters.

One advantage of a pin mixer is that residence time or retention time of the material in the mixer is controlled and limited, since the material moves as a plug flow down a path and then exits.

Alternatively, the wet beads may be produced by processing the peat moss and binder through an Eirich mixer and then through a disk pelletizer or spheronizer. An Eirich mixer is a high shear mixer available from the Eirich Company in Germany. The details and operation of an Eirich mixer are known and readily available and are incorporated by reference. It has a bowl or chamber in which the peat moss and binder are placed. The bowl turns in one direction and an S-shaped blade which descends into the bowl rotates at a high speed in the other direction, mixing and whipping and rapidly stirring with a rigid member the contents of the bowl and imparting high shear forces to the mixture. The Eirich mixer produces beads which typically are misshapen and not sufficiently round. The beads are then preferably taken from the Eirich mixer and are placed in an apparatus to improve the spheroidalness of the wet spheroidal beads. Suitable such apparatus include a disk pelletizer available from MMC Mars Mineral, and a spheronizer available from Niro, Inc., Columbia, Md. The details and operation of these devices are known and readily available and are incorporated by reference.

The wet beads after exiting the pin mixer or apparatus for improving spheroidalness are transported via conveyor or other means to a dryer, preferably a TURBO-Dryer available from Wyssmont Company, Inc., Fort Lee, N.J. or a dryer available from Carrier Corporation, such as their Model QAD-1260S-10.

With regard to FIGS. 2 and 3, there is shown a TURBO-Dryer 40 from Wyssmont Company, Inc. Dryer 40 has a casing 42 containing trays 44. A tray is shown in more detail in FIG. 3. The wet beads enter at inlet 46 and are transported along a pathway indicated by 48 to outlet 50. With regard to FIG. 3, the tray 44, which rotates in the direction indicated by arrow 56, has a fan 52 with blades 54 blowing hot air radially outward across the beads which are in ridged panes 58. The beads fall from the tray above to location or position 60, are leveled by stationary leveler 62, and are carried around on the tray in ridged panes 58 until they meet stationary wiper 64. Stationary wiper 64 wipes the beads from the ridged panes 58 as the ridged panes pass underneath and drops the beads through the open slots 66 as they pass beneath, the beads then dropping to the tray below, as indicated at 68.

In the TURBO-Dryer the beads are dried with hot air (about 200° F.) and rolled, which maintains and enhances the spheroidal shape, which is the preferred shape. Other dryers known in the art can be used, preferably those which also roll the material. The beads are dried to a moisture content of preferably between about 5% and about 10% by weight. The beads shrink as they dry. The dried beads have a bulk density typically of about 35–45, more preferably about 40, lbs/ft$^3$. Air drying is not preferred; it is time-consuming, inefficient and does not roll the beads.

The dried beads, which are preferably spheroidal, less preferably globular or orbular, are then preferably screened to sort by size. Typically there are three sizes: large (passes through U.S. Standard Sieve No. 8 but is retained on U.S. Standard Sieve No. 10, i.e., $-8 +10$), medium ($-10 +20$), and small ($-20 +50$), although larger and smaller beads may also be used. The openings in U.S. Standard Sieve Nos. 8, 10, 20, and 50 are approximately 2360, 2000, 850, and 300 microns, respectively. These screened beads are dimensionally stable and have a bulk density of about 35–45, more preferably about 40, lbs/ft$^3$. Undersized beads, if used, may be too small and might plug or clog the equipment. They are preferably fed back into the pin mixer, to be blended with raw peat moss, or specially run in the pin mixer by themselves. Oversized beads may be ground or shredded to a smaller size and rescreened, or fed back to the pin mixer as above, either ground or unground.

Bead density can be controlled by varying the amount and concentration of the binder added. Preferred beads are peat moss, moisture, and sodium silicate binder, preferably 1 to 30, more preferably 1 to 20, more preferably 1 to 10, even more preferably 1 to 5, weight percent sodium silicate. Preferably there is an effective weight percent of sodium silicate binder to make the beads hard, resilient, durable and resistant to breakage, since the weight percent of sodium silicate may vary depending upon the commercial or industrial application. Beads made as described above with sodium silicate had a rating of 50+ on the 18 inch drop test, where the bead is dropped from a height of 18 inches repeatedly until it fractures. The value is the average number of drops until fracture. These beads also tested 15 lbs for crush strength (placed between two plates; external pressure (in lbs) applied until bead fractures) and had 0% attrition loss (quantity of beads placed on a sieve and shaken for 5 minutes, the sieve openings being slightly smaller than the beads. Attrition loss is the percent that passes through). Preferably the beads have at least 10 lbs crush strength. The beads also were relatively spheroidal (more spheroidal than the beads of the Jeffers Report), the spheroidalness resulting in more symmetrical packing and waste water flowing therethrough has less tendency to flow nonuniformly through certain channels. The beads preferably have a cation exchange capacity (CEC) (per the method of Dr. Bloom of the University of Minnesota) of 2 to 5, more preferably 4.5 to 5, milliequivalents per gram. The beads have an internal porous structure so that water may penetrate and contact the peat moss throughout the bead.

Other sizes of beads may be used. Different applications typically require different bead sizes. Smaller beads have more surface area per pound and would tend to be preferred for lower flow rates of waste water and for lower concentrations of contaminants. For higher flow rates it may be preferable to mix small and large beads together. Larger beads tend to plug or clog less and may be preferred in less accessible locations.

The beads are preferably contained within containers such as burlap sacks, filter cartridges, nylon sacks, porous containers (such as porous plastic or polymer containers (the plastic or polymer itself being porous) made by or through Porex Technologies of Fairburn, Ga.) and containers with filter paper or filter material at the inlet and outlet to retain the beads. Such containers, canisters, or columns are known in the art. Waste water can be flowed over and/or through the beads retained within such containers.

Undersized beads or fines have high surface area per pound and may be used as air filters to remove metal contaminants from air streams, such as removing lead and heavy metals from smelter air. In this application as an air filter the fines or small particles are physically fixed in a matrix or container, in various forms and shapes as required by the application, and/or are enclosed such as in filter cloth, etc., or otherwise used to make an air filter the same way activated carbon is used to make an air filter, which is well-known in the art.

An alternative binder is polysulfone dissolved in methylene chloride, which is less hazardous than DMF. Preferably a fine powder polysulfone available from Amoco Performance Products, Inc., Alpharetta, Ga. as Product UDEL P-1800 NT is used. Preferably in an enclosed mixer and at about 70° F., approximately 35 lbs. of polysulfone is dissolved into each 300 lbs. of methylene chloride to form the polysulfone binder. The polysulfone binder is used in the process essentially the same as the sodium silicate binder. It is sprayed into the pin mixer onto the peat moss, however, typically about 300 lbs. of polysulfone binder are used per 100 lbs. of peat moss. Steps are taken to recover the methylene chloride, which is volatile and hazardous. The beads which come out of the pin mixer are dried in the dryer such as shown in FIG. 2, trying to remove as much methylene chloride as possible, again with solvent recapture. These beads are also sorted and preferably comprise 10 to 50, more preferably 20 to 30, weight percent polysulfone. These beads are porous, dimensionally stable, and preferably have physical characteristics comparable to the sodium silicate beads. It is believed that other binders may also be used in the invented process, particularly liquid binders such as a crosslinkable solution or copolymer of polyvinyl alcohol and polyacrylic acid.

Preferably the beads of the present invention are used to sorb metal and metalloid ion contaminants such as silver, iron, chromium, cobalt, uranium, mercury, nickel, arsenic, aluminum, cadmium, lead, manganese, copper, zinc and others from dilute aqueous solutions (pH preferably 4 to 9, more preferably 5.5 to 6, temperature preferably 33°–180° F., more preferably 50°–100° F.) such as acid mine drainage waters, in particular where the dissolved metals, such as heavy metals and transition metals, have concentrations less than 10 ppm, more preferably less than 1 ppm (mg/L), more preferably in the concentration range of 100 to 10 ppb. These metals and metalloids are elemental substances or elements. Such sorption is accomplished by bringing the dilute aqueous solutions into contact with the beads. The beads of the present invention are effective during relatively short contact times at 70° F. and at other temperatures, preferably 1 to 12 minutes, more preferably 2 to 6 minutes, in a fixed column. The beads are capable of greater than 99% removal efficiency in 2 minutes contact time (a flow rate of 30 BV/hr) in a fixed column for effluent containing 20 ppm copper and 20 ppm zinc at pH 6 and 70° F. The beads of the present invention exhibit selectivity for heavy metal ions over calcium and magnesium (a useful characteristic since calcium and magnesium frequently interfere with efficiency in this art) but are operable in waste streams with high concentrations of solids or metal ions. The beads work particularly well with copper, zinc, lead, cadmium, and mercury.

It is known that peat moss fixed in a polysulfone matrix in bead form can remove toxic and heavy metal ions from dilute aqueous solutions, particularly where the concentrations are less than 1 mg/L (sometimes referred to as "polishing"). See the Jeffers Report, cited above, the entire contents of which are incorporated by reference. The beads of the present invention can be substituted for the beads in the Jeffers Report and used in the same way and it is believed that they will perform comparable to or better than those beads.

The advantages of the invented beads over the beads of the Jeffers Report are several. The present peat moss/sodium silicate beads are made using far less hazardous materials and using a process which is simpler, more efficient, less expensive, and which produces more spheroidal beads. The invented peat moss/polysulfone beads are made without using DMF and using the simpler, more efficient process referenced above.

It is believed that the present peat moss/sodium silicate beads will generally remove heavy metal ions somewhat better than those made with polysulfone, but both are effective. The polysulfone binder is generally more stable physically than the sodium silicate and may work better where the pH is 8 or higher. The polysulfone bead is water-insoluble and is more temperature resistant and can operate at 120°–180° F. and higher, as well as at 32°–120° F. The sodium silicate beads are preferably used at temperatures below 120° F.; the sodium silicate binder may lose its shape and/or partially dissolve in an aqueous solution at or above 120° F.

Alternatively and generally preferably the peat moss may be pretreated by acid washing prior to being mixed with binder, to improve the performance of the peat moss. To acid wash, mix or wash the peat moss (possibly dampened) with acid, preferably 60–80% sulfuric acid (less preferably hydrochloric acid or other mineral acid, but not nitric acid), preferably for about 4 hours, drain, and rinse with water, preferably until the pH is about 3–4. Then remove some of the moisture, preferably until the peat moss is 40–60% moisture by weight, preferably by spin drying, less preferably by air drying or drying in a heated dryer. Preferably do not acid wash so much that the humic or fulvic substances are removed. Acid washing removes waxes and bitumens, which tend (a) to interfere with the operation and effectiveness of the peat moss in sorbing metal ions, and (b) to leach out, discoloring the water being treated. This leaching phenomenon may increase the chemical oxidation demand (COD) and decrease the pH. Thus, generally acid wash until the discoloring material is reduced. Suitable acid washed peat moss (acid washed using a comparable technique) is also available from Prodex, Inc., Akron, Ohio.

The beads of the present invention can be effectively regenerated by (a) passing two bed volumes of 1.5 to 3% $H_2SO_4$ (unless lead is present, in which case use 1 to 2% nitric acid) through the bead-filled container at an upflow rate of 6–10 bed volumes per hour (BV/hr); (b) passing one bed volume of $H_2O$ (preferably deionized) through said container at the same rate; (c) passing two bed volumes of 0.07 to 0.2 M $Na_2CO_3$ through said container at the same rate; and (d) repeating step (b). By this technique valuable metal contaminants can be recovered from the beads in solutions amenable to further processing, and regenerated beads can be reused. The valuable metal contaminants can subsequently be recovered from the solutions using techniques known in the art. The invented beads can be reused and cycled through the regeneration procedure many times and still be effective.

It is also possible to run the beads through the above regeneration procedure prior to the time the beads are first used. This is called conditioning the beads. Generally it is not economical to condition the beads prior to their first use. Unconditioned beads, on first use, are typically about 80 to 95% as efficient as conditioned beads on first use. When unconditioned beads are regenerated after first use, they get to near their peak efficiency. The beads of the present invention will generally increase slightly in efficiency through the first few (up to about 7) regeneration cycles.

The following Examples illustrate various aspects of the present invention.

EXAMPLE 1

Peat moss/sodium silicate beads were produced as described above without acid washing. These beads were placed in a 1 L column and subjected to a municipal sludge dewatering leachate at room temperature with a pH of 5 that contained 1.2 ppb Hg. Using an upflow mode with a rate of 6 bed volumes/hr (BV/hr), the effluent after one pass was measured to be non-detectable (less than 0.4 ppb). 6 BV/hr= 10 minutes contact time. This demonstrates the ability to achieve removal results in the non-detectable ppb range, and it is believed that results with other metal contaminants including copper, zinc, cadmium, lead, and nickel would be comparable.

EXAMPLE 2

Beads made as in Example 1 were placed in a 1 L column and subjected to a room temperature test effluent that contained 49.4 ppm Zn at a pH of 7. Using an upflow mode with a rate of 10 BV/hr, the effluent after one pass was measured to be 0.37 ppm Zn. This demonstrated high removal efficiency (99.1%) at a higher flow rate, and an ability to operate efficiently at a higher than normal pH (ie, 7).

EXAMPLE 3

Beads made as in Example 1 were placed in a 6.25 L column and subjected to a room temperature test effluent at a pH of 6 that contained 8.95 ppm Zn. Using an upflow mode with a rate of 6 BV/hr, the effluent after one pass was measured to be 73 ppb, thus demonstrating high removal efficiency (99.2%) and an ability to operate efficiently in the ppb range.

EXAMPLE 4

Beads made as in Example 1 were placed in a 2 L column and subjected to a plating rinse effluent at room temperature and pH of 4.5 that contained 7.41 ppm Cu, 0.95 ppm Ni, and 0.90 ppm Pb. Using a downflow mode with a rate of 30 BV/hr (2 minutes contact time), the effluent after one pass was 7 ppb Cu, below detectable limits Ni, and less than 1 ppb Pb, thus demonstrating high removal efficiencies, the ability to operate efficiently at higher flow rates and in the ppb range, all in a multiple metal effluent.

EXAMPLE 5

Beads made as in Example 1 were placed in a 6.25 L column and subjected to a plating rinse effluent at room temperature that contained 2.02 ppm Zn at a pH of 12. Using an upflow mode with a rate of 10 BV/hr, the effluent after one pass was 0.28 ppm Zn, thus demonstrating high removal efficiency (86.1%) at an extremely basic pH. Also, the beads maintained their mechanical shape (spheroidal) in this elevated pH, demonstrating substantial mechanical qualities.

EXAMPLE 6

Beads were prepared using a bench scale mixing/drying process combining peat moss with polysulfone dissolved in methylene chloride. The resulting beads were (by volume) about 74% peat moss, about 25% polysulfone, and less than 1% methylene chloride. About 0.01 L of these beads were placed in a test reactor along with about 0.5 L of effluent at room temperature and pH of 6.5 containing 20 ppm Mn, 20 ppm Co, 20 ppm Fe, and 15 ppm Ni. The material was stirred. After 5 minutes the sample effluent was 0.38 ppm Mn, 0.61 ppm Co, 1.23 ppm Fe, and 0.9 ppm Ni. At 10 minutes the sample effluent was 0.27 ppm Mn, 0.4 ppm Co, 1.03 ppm Fe, and 0.9 ppm Ni. At 60 minutes the sample effluent was 0.2 ppm Mn, 0.31 ppm Co, 1.01 ppm Fe, and 0.87 ppm Ni. This demonstrates a rapid and efficient removal rate in a multiple metal effluent. A comparable test was run using polysulfone beads made as set forth in the Jeffers Report; at 5 minutes the effluent was from 7 to 10 ppm for each metal, at 10 minutes from 4 to 6 ppm for each metal, and at 30 and 60 minutes from 1 to 2 ppm for each metal.

It should be evident that this disclosure is by way of example and that various changes may be made by adding, modifying or eliminating details or elements without departing from the fair scope of the teaching contained in this disclosure. The invention is therefore not limited to particular details of this disclosure except to the extent that the following claims are necessarily so limited.

What is claimed is:

1. A bead consisting essentially of peat moss and sodium silicate, said sodium silicate acting as a binder to immobilize said peat moss, said bead being capable of sorbing a metal or metalloid dissolved in a dilute aqueous solution at a concentration of less than 10 parts metal or metalloid per million parts solution (ppm), said metal or metalloid being selected from the group consisting of silver, iron, chromium, cobalt, uranium, mercury, nickel, arsenic, aluminum, cadmium, lead, manganese, copper, and zinc, the exterior portion of said bead including peat moss.

2. The bead of claim 1, said bead being spheroidal and passing through U.S. Standard Sieve No. 8 and being retained on U.S. Standard Sieve No. 50.

3. The bead of claim 1, said peat moss being sphagnum peat moss having a Von Post index between about 5 and 9, said bead being between about 1 and about 30 weight percent sodium silicate.

4. The bead of claim 1, said bead being capable of 99.9% removal efficiency at a flow rate of 30 BV/hr in a fixed column for effluent containing 7.41 ppm copper.

5. A method of making a metal-ion-sorbing bead, said bead being effective to sorb metal ions from a dilute aqueous solution, said metal being selected from the group consisting of silver, iron, chromium, cobalt, uranium, mercury, nickel, aluminum, cadmium, lead, manganese, copper, and zinc, the method comprising the steps of:

a) providing nonliving biomass and liquid binder to a chamber of an apparatus for mechanical spheronization, said chamber being equipped with means to impart high shear forces to the contents thereof;

b) imparting high shear forces to the biomass and liquid binder, said high shear forces being effective to mix said biomass and binder together into a mixture;

c) forming the mixture into wet beads; and d) drying the wet beads to form beads effective to sorb said metal ions from a dilute aqueous solution.

6. The method of claim 5, wherein the apparatus for mechanical spheronization is a pin mixer and the nonliving biomass is peat moss.

7. The method of claim 5, wherein the liquid binder is sodium silicate dissolved in water.

8. The method of claim 5, wherein the liquid binder is polysulfone dissolved in methylene chloride.

9. The method of claim 5, the method forming spheroidal or globular beads, said spheroidal or globular beads being capable of passing through U.S. Standard Sieve No. 8 and being retained on U.S. Standard Sieve No. 50.

10. The method of claim 5, wherein said nonliving biomass is peat moss and further comprising the step of acid washing said peat moss prior to mixing said peat moss and liquid binder together.

11. A bead according to claim 1, said concentration of metal or metalloid in said solution being less than 1 ppm.

12. A bead according to claim 1, said bead having a crush strength of at least 10 lbs.

13. A bead according to claim 1, said bead consisting of sphagnum peat moss and sodium silicate.

14. A method according to claim 6, the method forming spheroidal or globular beads, said spheroidal or globular beads being capable of passing through U.S. Standard Sieve No. 8 and being retained on U.S. Standard Sieve No. 50.

15. A method according to claim 6, the method forming spheroidal or globular beads, said spheroidal or globular beads being capable of 99.9% removal efficiency at a flow rate of 30 BV/hr in a fixed column for effluent containing 7.41 ppm copper.

16. A method according to claim 15, said peat moss being sphagnum peat moss having a Von Post index between about 5 and 9.

17. A method according to claim 15, said spheroidal or globular beads having a crush strength of at least 10 lbs.

18. A method according to claim 15, said spheroidal or globular beads being between about 1 and about 30 weight percent binder.

19. A method according to claim 17, said spheroidal or globular beads having a bulk density of about 35–45 lbs/ft$^3$.

20. A bead according to claim 1, said bead consisting of peat moss and sodium silicate.

21. A method according to claim 5, the method forming beads consisting essentially of peat moss and binder.

22. A method according to claim 21, the method forming beads consisting of peat moss and binder.

23. A method according to claim 6, the method forming beads consisting essentially of peat moss and binder.

24. A method according to claim 23, the method forming beads consisting of peat moss and binder.

* * * * *